June 2, 1942.  W. A. SCHRAK  2,284,771
SHOCKPROOF MOUNTING
Filed Sept. 20, 1941

Inventor
William A. Schrak.
By David F. Doody.
Attorney

Patented June 2, 1942

2,284,771

UNITED STATES PATENT OFFICE 2,284,771

SHOCKPROOF MOUNTING

William A. Schrak, East Orange, N. J., assignor to Bendix Aviation Corporation, South Bend, Ind., a corporation of Delaware Application September 20, 1941, Serial No. 411,727

5 Claims. (Cl. 248—358)

This invention relates to shock-proof mountings, and more particularly to a system whereby a unit may be resiliently suspended in a vehicle such as an aircraft.

It is an object of the present invention to provide a shock-proof mounting wherein resilient material is bonded to rigid fastenings in a manner to provide a serviceable and efficient mounting.

Other objects of the invention include the provision of means whereby a unit to be suspended may be readily suspended or removed from suspension, and whereby failure of the resilient suspension will not entail a loss or breakage of the unit suspended.

Other objects will appear from a study of the following specification when made in conjunction with the attached drawing, throughout which like numerals designate like parts.

Figure 1:
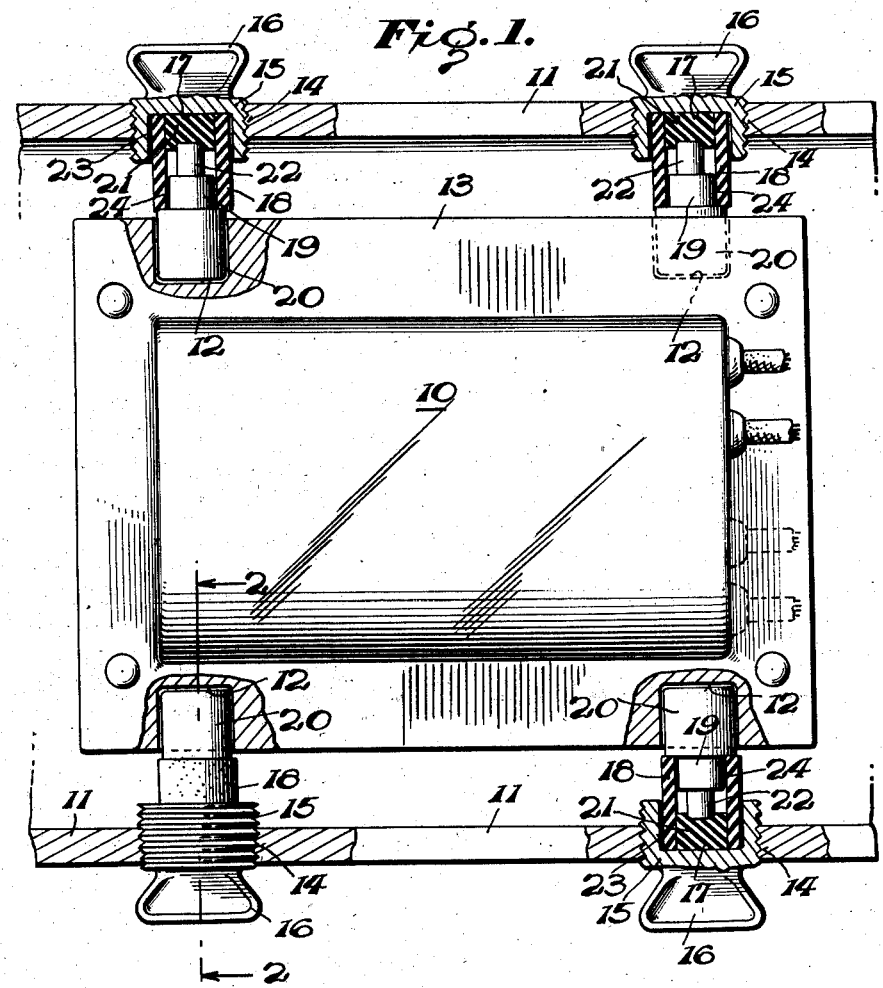
Fig. 1 is a plan view, with certain parts in section, of an element suspended in a shock-proof mounting of the present invention.
Figure 2:
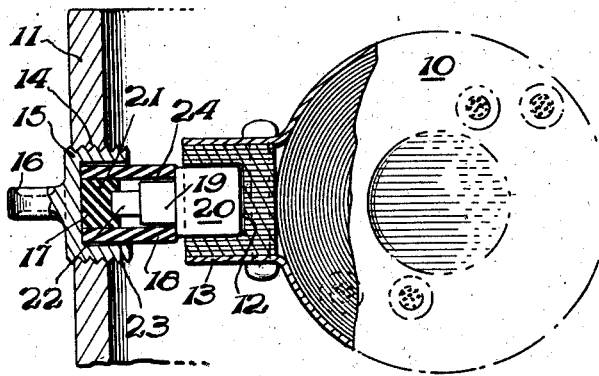
Fig. 2 is an elevational view, partly in section, taken along the line 2—2 of Fig. 1.

Having reference to the drawing, 10 represents a unit, such as a voltage regulator or transformer, which is to be mounted for shock-proof suspension in a base member 11, which may be readily attached to the interior of an aircraft cabin.

Unit 10 has four cylindrical recesses 12, formed in the flange 13 of unit 10, and these recesses are disposed symmetrically with two on opposite sides of the unit 10.

The mounting base 11 has aligned screw-threaded apertures 14 opposite the recesses 12, and these apertures carry hollow or cup-shaped screw-threaded members 15, of steel, aluminum, brass or the like, with integral adjusting means, such as wing members 16. The interior wall of each of the cup-shaped members 15 is a cylindrical, and has a flat bottom surface 17. A short section of resilient tubing, such as rubber, Neoprene or the like, designated as 18, has one end fitted within member 15, and its other end embracing a cylindrical shoulder portion 19 of a head member 20, which is also shown as being cylindrical. Carried within cup-shaped member 15, and against bottom surface 17, there is a resilient plug member 21 of rubber, Neoprene or the like, which has a tight fit with the inner surface of tube 18. Head member 20 and shoulder portion 19 thereof, terminate in a cylindrically shaped shank 22, which is of such length that its end presses slightly into resilient plug 21, forcing plug 21 into closer engagement with the inner wall of tube 18.

One end of tube 18 is fixed to the inner surface of cup-shaped member 15, and the other end of tube 18 is fixed to cylindrical shoulder 19, by means of a rubber-to-metal bond, designated by the lines 23 and 24. The bond extending through the areas represented by lines 23 and 24 may be formed by any of the well known bonding procedures, by which rubber or the like may be held with firm adherence to a metal surface.

Assuming unit 10 to be suspended as shown, if it is desired to remove the unit for servicing or for replacement of a defective unit, the operator merely unscrews members 15 from one side of base member 11, upon which the unit 10 may be withdrawn from the two head members 20 on the other side of the base 11. The provision of wings 16 makes the insertion and removal of cup-shaped members 15 a very quick, and yet positive, procedure. It should be noted that shanks 22 extend within the projection of the outer portion of cup-shaped members 15, so that upon failure of resilient tube 18, shank 22 will strike upon the inner surface of member 15, and carry the weight of the unit 10, and thus avoid the loss or breakage of the unit should it drop completely from its suspension.

Heads 20 may fit within recesses 12 with a close, but free, sliding fit, so that quick insertion and withdrawal of heads 20 may be effected.

It will be seen that by the use of a shock-proof mounting of the type herein described, a unit 10 to be resiliently suspended may be maintained securely in space, and yet, be suspended in a manner which prevents the transfer of harmful vibration from base 11 to unit 10. The resilience of each of the tubes 18 is such that free, lateral displacement of unit 10 may be effected, and the projection of shanks 22 into resilient plugs 21 will be such that excessive side play of unit 10 will be eliminated, without, however, impairing of the efficiency of the damping provided by the resilient mounting shown. The tension or rigidity of the coupling between unit 10 and base 11 may be regulated by advancing members 15 in or out, as desired, thus changing the tension of tubes 18 and consequently, the resilient coupling between unit 10 and base 11.

It is obvious that the invention may be embodied in forms other than that shown. For this reason, it is desired not to limit the invention to the particular example chosen to describe it, but only by the scope of the appended claims.

What is claimed is:

1. A resilient suspension comprising a rigid base, a member to be resiliently suspended on said base, a plurality of cylindrical recesses formed in said member on opposite sides thereof, a threaded aperture formed in said base opposite each of said recesses, a plug threaded therein, said plug having a recessed portion, a section of resilient tubular material carried within said recessed portion and bonded thereto, a resilient plug carried within said tubular material, a cylindrical, rigid head member loosely carried within each of said recesses, said head member having a cylindrical shoulder of less diameter than said head member, said shoulder having said section of tubular resilient material bonded thereto, and a shank portion integral with said head and shoulder projecting into said resilient plug.

2. A resilient suspension comprising a rigid base, a unit to be suspended from said base, a cylindrical recess formed in said unit, an aligned hole formed in said base, a suspension pin assembly spanning said base, through said hole, and said recess, said assembly including a cup-shaped member having means for securing it to said base a length of resilient tubing having one end within said cup-shaped member and bonded thereto, a resilient plug within said tubing and within said cup-shaped member, a rigid cylindrical head member projecting from the other end of said tubing and bonded thereto, said head member lying within said recess, and a shank portion carried by said head member within said tubing contacting said plug.

3. A resilient suspension comprising a base, a unit to be suspended from said base, aligned openings formed in said base and in said unit, a suspending member spanning said base and said unit through said aligned openings, said member including a hollow member having means for securing it to said base, a head fitting into the opening in said unit, a length of resilient tubing having one end carried within said hollow member and the other carried on said head, a resilient plug within said tubing and within said hollow member, and a shank portion formed on said head within said tubing in compressing relation to said plug.

4. A member for extending between a fixed base and a unit to be resiliently suspended from said base, including a base-engaging portion and a unit-engaging portion, said base-engaging portion being generally cup-shaped, said unit-engaging portion being cylindrical, a resilient tube extending from said base-engaging portion to said unit-engaging portion and bonded to each, a resilient plug carried within said base-engaging portion and a shank member carried within said tube by said unit-engaging portion and in contact with said plug.

5. A resilient suspending member to be secured to a base and to a unit to be suspended, said member including a base-engaging portion and a unit-engaging portion, said base-engaging portion having a hollow portion, said unit-engaging portion including a cylindrical shoulder, a resilient tube extending from said base-engaging portion to said unit-engaging portion and secured to said shoulder, a resilient plug carried within said base-engaging portion and a shank member carried within said tube and contacting said plug.

WILLIAM A. SCHRAK.